(12) United States Patent
Einsiedel et al.

(10) Patent No.: US 6,318,754 B1
(45) Date of Patent: Nov. 20, 2001

(54) AIRBAG APPARATUS WITH A GAS GENERATOR

(75) Inventors: Heinrich Einsiedel, Ulm; Oliver Glöckler, Nersingen, both of (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 09/358,726

(22) Filed: Jul. 22, 1999

(30) Foreign Application Priority Data

Jul. 31, 1998 (DE) .............................................. 198 34 690

(51) Int. Cl.[7] .................................................. B60R 21/26
(52) U.S. Cl. ............................................ 280/736; 280/742
(58) Field of Search ................................. 280/741, 742, 280/736, 740, 730.1, 730.2; 222/3; 285/132.1, 188, 420

(56) References Cited

U.S. PATENT DOCUMENTS

| | | | |
|---|---|---|---|
| 3,937,488 | * | 2/1976 | Wilson et al. ........................ 280/736 |
| 5,308,108 | * | 5/1994 | Rion .................................. 280/728.2 |
| 5,536,041 | * | 7/1996 | Acker et al. .......................... 280/740 |
| 5,775,726 | * | 7/1998 | Timothy et al. ..................... 280/730.1 |
| 6,070,903 | * | 6/2000 | Beisswenger et al. ............... 280/736 |

FOREIGN PATENT DOCUMENTS

| | | |
|---|---|---|
| 196 29 541 | 1/1998 | (DE) . |
| 297 22 793 | 4/1998 | (DE) . |
| 298 01 104 | 7/1998 | (DE) . |

* cited by examiner

Primary Examiner—J. J. Swann
Assistant Examiner—David R. Dunn
(74) Attorney, Agent, or Firm—Foley & Lardner

(57) ABSTRACT

The invention relates to an airbag apparatus comprising a gas generator (11) which has at a periphery a plurality of, preferably two diametrically oppositely lying gas outlet openings (12), a housing (13) which receives the gas flowing out of the gas generator (11) and is mounted at the gas generator in a gas and pressure tight manner, and a gas conduction line (14) leading to an inflatable gas bag. The invention consists in that the housing (13) lies in contact with the outer periphery of the gas generator (11) only at one side and has at least one gas inlet opening (15) lying opposite to a gas outlet opening (12); and in that at least one gas inlet opening (15), which lies diametrically opposite to a gas outlet opening (12), is closed by a closure means (16), in particular a plug, in a gas and pressure tight manner.

14 Claims, 3 Drawing Sheets dance with the preamble of claim 1.

AIRBAG APPARATUS WITH A GAS GENERATOR

The invention relates to an airbag apparatus in accordance with the preamble of claim 1.

The gas generator housings of known airbag apparatuses consist either of two half shells which surround the gas generator over a certain length, with a radial and areal covering being required, or a single-piece housing with two radial seals at the periphery of the gas generator or with a radial seal and a closed side is provided.

Housings of this kind are very voluminous and heavy so that they can be managed and accommodated only with difficulty in particular for the installation in head airbag apparatuses.

The object of the invention is to provide an airbag apparatus of the initially named kind which has a very low space requirement and no great weight without problems of tightness, mounting or safety arising.

The features of the characterising part of claim 1 are provided for satisfying this object.

In accordance with the invention thus the housing which is connected to the gas generator is distinguished in that, of the generally two openings or groups of openings which are present, in each case only one is associated with a housing which is to be placed on at one side. The sealing surface is located very close to the associated gas outlet opening. Through this the forces which act on the seal are minimised. The other gas outlet opening is preferably closed during the mounting.

Through this a complicated and expensive housing is dispensed with which collects the gas of all openings and then conducts it into gas conduction line, which is preferably designed as a hollow tube. It is however also conceivable that two housings in accordance with the invention are placed at the two diametrically oppositely disposed openings for the parallel feeding of two gas bags.

Because in accordance with the invention only one opening is available in a housing for the gas outflow instead of two openings, the bores must be so large that the remaining bore(s) have the size required for the function. The size of the bores must be provided in the manufacture of the gas generator.

The gas outlet opening of the gas generator which is to be covered over by a closure means or a further one-sided housing is retained for the purpose of the transport because the gas generators are thereby thrust-neutral until the assembly, i.e. during the entire transport. For this reason the gas outlet opening which is possibly not used in the later operation is only closed after the transport during the installation or shortly prior to the installation into the vehicle.

Advantageous further developments of the invention are characterised by the subordinate claims.

The invention will be described in the following in an exemplary manner with reference to the drawings. In these are shown.

Figure 1:
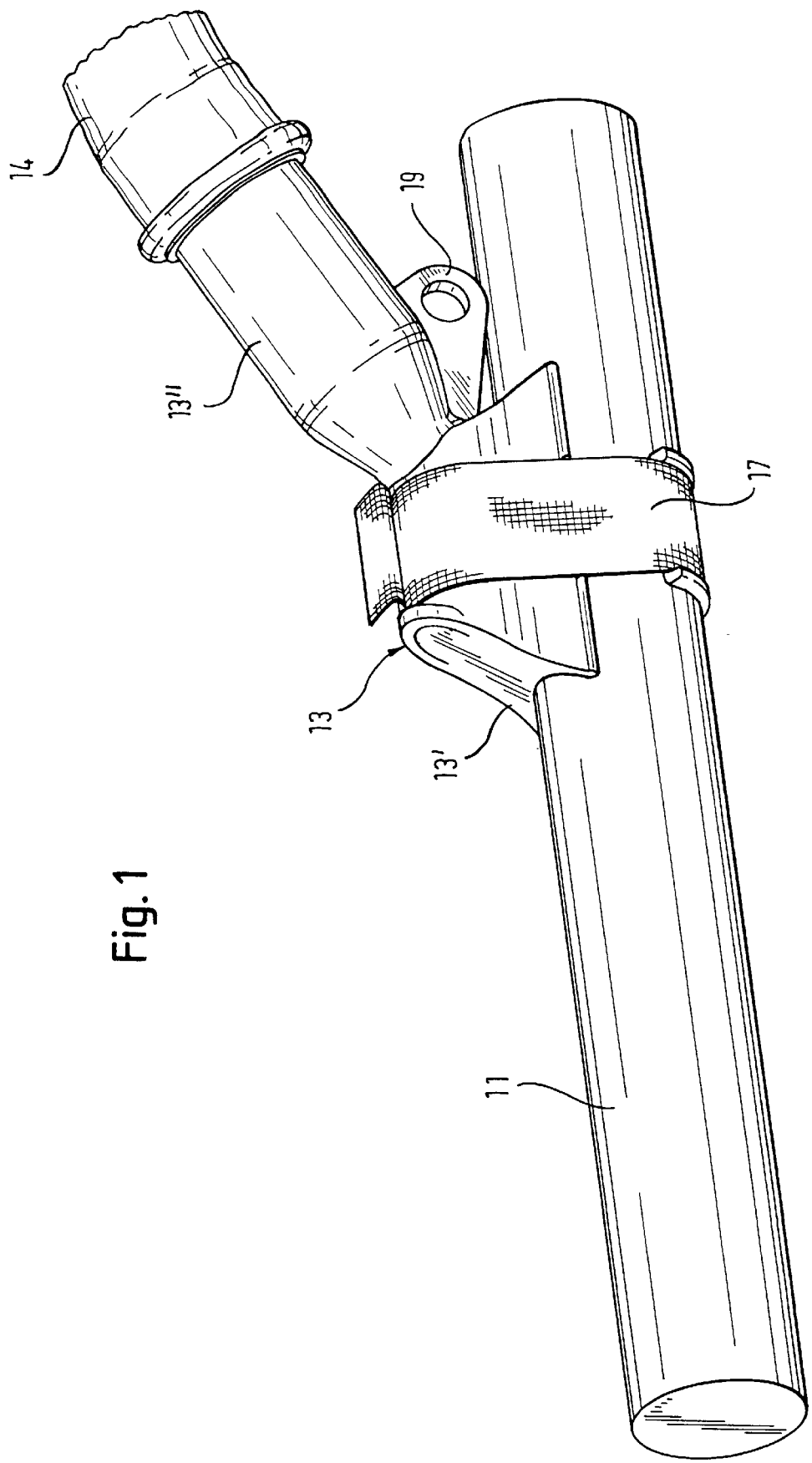
Figure 2:
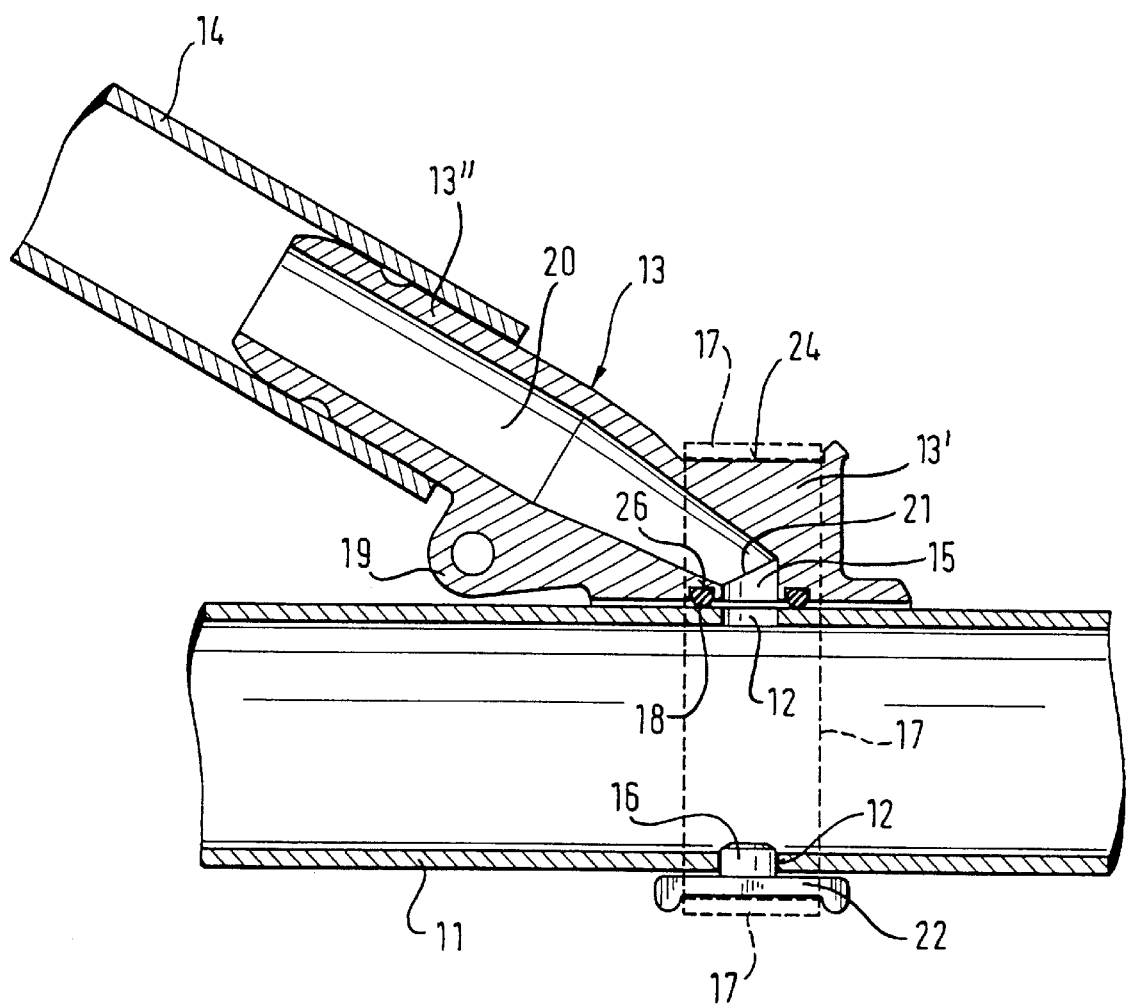
Figure 3:
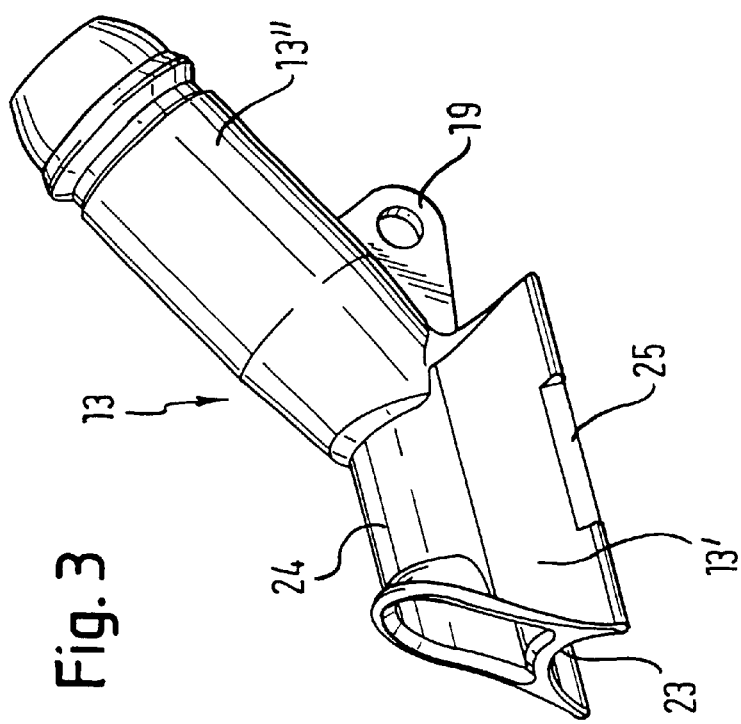
Figure 4:
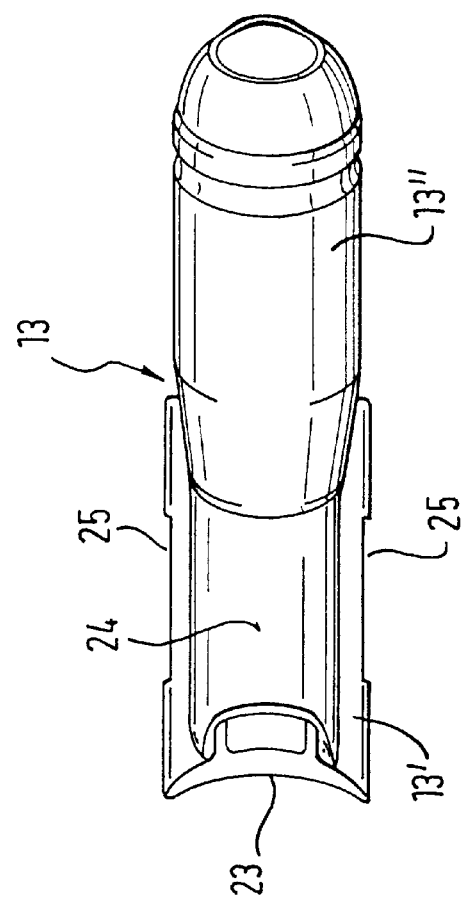

FIG. 1 a perspective view of the gas generator of an airbag apparatus in accordance with the invention which is connected to a gas lead-off housing, FIG. 2 a vertical longitudinal section through the subject of FIG. 1, and indeed, seen from the opposite side as in FIG. 1, FIG. 3 a perspective view of only the gas lead-off housing of an airbag apparatus in accordance with the invention and FIG. 4 a plan view of the subject of FIG. 3.

In accordance with FIG. 2 a usual, tubular gas generator 11 has two diametrically oppositely disposed gas outlet openings at its end region. The lower gas outlet opening 12 in FIG. 2 is closed in a gas and pressure tight manner by a plug 16 which is radially inserted from the outside. The plug is fastened to a holder clamp 22 which is placed onto the gas generator 11 from the outside together with the plug 16.

Lying diametrically opposite to the holder clamp 22 there is a one-sided housing 13 which is designed in accordance with the invention and which in accordance with FIGS. 1 to 4 consists of a mounting housing part 13' which is to be placed onto or is placed onto the gas generator 11 and a line connection part 13" which branches off outwardly at an inclination from it. The mounting housing part 13' is formed in the manner of a groove on the side which faces the outer wall of the gas generator 11 and indeed in such a manner that the groove-like cut-out is formed complementarily to the outer periphery of the gas generator 11. The mounting housing part 13' is thus seated astride the gas generator 11, with the region taken up by the groove-like cut-out 23 extending in the peripheral direction over an angle of less than 180° and preferably approximately 90 to 160°.

Radially outside the cut-out 23 there is a saddle-shaped support surface 24 which extends up to two lateral depressions 25 at the radial inner edge of the mounting housing part 13'. The support surface 24 and the cut-outs 25 have a width such that a tension band 17 can be laid therein which is laid around the gas generator 11 and the holder clamp 22 at the diametrically opposite side. Through tensioning of the tension band 17 the housing 13 and the holder clamp 22 with the plug 16 are firmly tensioned against the outer wall of the gas generator 11.

In order to seal off the housing 13 against the gas generator 11 in a gas and pressure tight manner a ring groove 26 into which a ring seal 18 in the form of an O-ring is inserted is provided round about a gas inlet opening 15 of the mounting housing part 13' which lies directly opposite to the upper gas outlet opening 12 of the gas generator 11. The ring groove 26 and the O-ring 18 follow the curvature of the gas generator 11 in this so that when the gas outlet opening 12 is laid onto the gas generator 11 in accordance with FIGS. 1 and 2 a complete sealing off between these two components is ensured. Because the ring seal 18 is directly and closely laid about the gas inlet opening 15 the forces which act on the seal are comparatively low.

A gas conduction passage 20 which extends axially through the line connection part 13" branches off at an angle bend 21 ahead of the gas inlet opening 15. The line connection part 13" serves to keep gas and pressure tight a gas conduction line 14 which is axially pushed tightly onto the line connection part 13' in accordance with FIG. 2. The gas conduction line 14, which is executed for example as a tube or a hose, leads to a gas bag, which is not illustrated in the drawings and which is to be inflated when the gas generator 11 ignites.

In the angle wedge between the gas generator 11 and the line connection part 13" of the housing 13 a connection eye 19 which serves for the mounting of the constructional unit consisting of the gas generator 11 and the housing 13 at a suitable place on the vehicle body is formed at the line connection part 13".

The mounting of the housing in accordance with the invention takes place as follows:

First the housing 13 in accordance with the invention and the holder clamp 22 with the plug 16 are brought into the position which can be seen in FIG. 2. Then the tension band 17 is placed around the gas generator, the housing 13 and the holder clamp 22 and firmly tensioned for example by means of a suitable tensioner apparatus, through which on the one hand the housing 13 and on the other hand the holder clamp 22 with the plug 16 are pressed radially inwardly against the gas generator 11 so firmly that a constructional unit is practically formed between these components and an absolutely gas tight flow connection between the gas generator 11 and the gas conduction line 14 is achieved.

Instead of the plug 16 a second, one-sided, similar housing 13 could also be arranged diametrically opposite to the illustrated housing 13 and firmly tensioned by means of the same tension band 17 in the event that a second gas bag is to be inflated by the same gas generator 11.

| List of Reference Numerals | |
|---|---|
| 11 | gas generator |
| 12 | gas outlet opening |
| 13 | housing |
| 13' | mounting housing part |
| 13" | line connection part |
| 14 | gas conduction line |
| 15 | gas inlet opening |
| 16 | plug |
| 17 | tension band |
| 18 | ring seal |
| 19 | connection eye |
| 20 | gas conduction passage |
| 21 | angle bend |
| 22 | holder clamp |
| 23 | cut-out |
| 24 | support surface |
| 25 | cut-out |
| 26 | ring groove |

What is claimed is:

1. An airbag apparatus comprising:
   a gas generator including a pair of gas outlet openings positioned diametrically opposed at a periphery of the gas generator;
   a housing positioned to receive a gas flowing out of the gas generator, the housing including
       a mounting portion mounted to the gas generator in a gas and pressure tight manner and
       a line connection portion angled outwardly away from the gas generator and connected to a gas conduction line leading to an inflatable gas bag,
   wherein the mounting portion only contacts one side of an outer wall of the gas generator and includes a gas inlet opening positioned opposite to one of the pair of gas outlet openings;
   a ring seal located between the mounting portion and the gas generator and surrounding the gas inlet opening of the housing and the associated gas outlet opening of the gas generator;
   wherein the mounting portion includes a support surface positioned substantially parallel to the gas inlet opening and located over the gas inlet opening and the ring seal;
   a closure device for closing the other of the pair of gas outlet openings in a gas and pressure tight manner; and
   a tension means overlying the support surface and the closure device for pressing the mounting portion and the closure device to the periphery of the gas generator.

2. Apparatus in accordance with claim 1,
   wherein the housing includes an inner surface having a complementary shape to the outer wall of the gas generator in the region of the contact with the gas generator.

3. Apparatus in accordance with claim 1, wherein the housing includes a connection eye located at the line connection portion for mounting the apparatus to a vehicle body.

4. Apparatus in accordance with claim 3 wherein the gas conduction passage has an angle bend in the direction towards the gas outlet opening in the vicinity of the gas outlet opening.

5. Apparatus in accordance with claim 1 wherein the housing further comprises
   a gas conduction passage in fluid communication with and positioned at an angle to the gas inlet opening.

6. The apparatus of claim 1, wherein the closure device comprises a plug.

7. The apparatus of claim 1, wherein the closure device comprises a housing.

8. The apparatus of claim 1, wherein the tension means comprises a band.

9. The apparatus of claim 1, wherein the tension means comprises a clamp.

10. The apparatus of claim 1, wherein the angle between the line connection portion and the longitudinal axis of the gas generator is greater than zero and less than ninety degrees.

11. The apparatus of claim 1, wherein the gas conduction passage includes a region having a gradually diminishing diameter adjacent to the gas inlet opening.

12. The apparatus of claim 1, wherein the mounting portion includes an exterior surface substantially parallel to the outer wall of the gas generator configured to receive the closure device.

13. The apparatus of claim 12, wherein the closure device comprises a band overlying and in contact with the exterior surface of the mounting portion and the outer wall of the gas generator.

14. The apparatus of claim 12, wherein the gas generator is tubular.

* * * * *

UNITED STATES PATENT AND TRADEMARK OFFICE
CERTIFICATE OF CORRECTION

PATENT NO. : 6,318,754 B1
DATED : November 20, 2001
INVENTOR(S) : Henirich Einsiedel et al.

It is certified that error appears in the above-identified patent and that said Letters Patent is hereby corrected as shown below:

Title page,
Item [73], the name of the Assignee is deleted and replaced with the correct Assignee.
-- Takata (Europe) Vehicle Safety Technology GmbH --

Signed and Sealed this

Twenty-third Day of April, 2002

Attest:

Attesting Officer

JAMES E. ROGAN
*Director of the United States Patent and Trademark Office*